United States Patent
Schweizer et al.

(10) Patent No.: US 7,392,097 B2
(45) Date of Patent: *Jun. 24, 2008

(54) AUTOMATED ATTRACTION AND RIDE MAINTENANCE VERIFICATION SYSTEM

(75) Inventors: Kenneth William Schweizer, Orlando, FL (US); Vincent Joseph Bailey, Kissimmee, FL (US); Ivan Rene Diaz, Orlando, FL (US); Rachel Strelecky Hutter, Orlando, FL (US); Craig Forrest Lake, Clermont, FL (US); George Joseph Orta, Eustis, FL (US); Mark Schaeffer, Clermont, FL (US); Johnie Larry Thomas, Orlando, FL (US); Mark Thomas Winkelbauer, Kissimmee, FL (US); John Howard Seybert, Montverde, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/530,995

(22) Filed: Sep. 12, 2006

(65) Prior Publication Data

US 2007/0021845 A1    Jan. 25, 2007

Related U.S. Application Data

(63) Continuation of application No. 11/056,528, filed on Feb. 11, 2005, now Pat. No. 7,177,706.

(60) Provisional application No. 60/601,409, filed on Aug. 13, 2004.

(51) Int. Cl.
*G05B 11/01* (2006.01)
*G05B 15/00* (2006.01)
*G01M 17/00* (2006.01)
*G01B 3/00* (2006.01)
*G06F 19/00* (2006.01)
*G06F 11/30* (2006.01)
*G06F 11/00* (2006.01)
*G06F 15/00* (2006.01)

(52) U.S. Cl. .............................. 700/17; 700/18; 700/19; 700/21; 700/83; 701/29; 702/33; 702/34; 702/182; 702/188

(58) Field of Classification Search .................. 700/21, 700/17–19, 83; 701/29; 702/33–34, 182–185, 702/188
See application file for complete search history.

(56) References Cited

U.S. PATENT DOCUMENTS

| 6,122,571 | A  | 9/2000  | Gerstner et al. |
| 6,480,810 | B1 | 11/2002 | Cardella et al. |
| 6,519,552 | B1 | 2/2003  | Sampath et al.  |
| 6,553,336 | B1 | 4/2003  | Johnson et al.  |
| 6,675,132 | B2 | 1/2004  | Vataja          |
| 6,691,007 | B2 | 2/2004  | Haugse et al.   |

(Continued)

*Primary Examiner*—Ronald D Hartman, Jr.
(74) *Attorney, Agent, or Firm*—Greenberg Traurig, LLP

(57) ABSTRACT

A system for preventative maintenance of a ride or an attraction component at a venue. A validator establishes the identity of the ride or attraction component and a controller monitors the use of the ride or attraction component. The controller also manage the ride or attraction component's availability for patron usage and transmits this information to a system control panel. A blocking device controlled by the panel prevents patron usage of a ride or attraction component that is in non-compliance with pre-established operating standards.

21 Claims, 10 Drawing Sheets

U.S. PATENT DOCUMENTS

| | | |
|---|---|---|
| 6,691,064 B2 | 2/2004 | Vroman |
| 6,701,286 B2 | 3/2004 | Kauppila |
| 6,721,685 B2 | 4/2004 | Kodama |
| 6,721,689 B2 | 4/2004 | Markle et al. |
| 6,725,182 B2 | 4/2004 | Pagnano et al. |
| 6,741,951 B2 | 5/2004 | Whaling et al. |
| 2002/0059270 A1* | 5/2002 | Schlabach et al. ........... 707/100 |

* cited by examiner

AUTOMATED ATTRACTION AND RIDE MAINTENANCE VERIFICATION SYSTEM

RELATED APPLICATION

This application is a continuation of application Ser. No. 11/056,528, filed Feb. 11, 2005, which claims priority to U.S. Provisional application Ser. No. 60/601,409, filed Aug. 13, 2004, the contents of which are incorporated herein by reference in their entirety.

BACKGROUND

1. Field of the Invention

The invention relates to the management of attractions and rides at a venue which automatically monitors the ride or attraction at a venue and prevents use of the same until maintenance is performed.

2. General Background and State of the Art

In theme parks and certain other venues, certain ride or attraction critical corrective maintenance and legislated Preventive Maintenance (PM) must be completed at the ride or attraction before the ride or attraction is available for patron use. Both "ride" and "attraction" are used interchangeably throughout this disclosure to refer to a ride or attraction at a venue, such as at an amusement park.

In such parks and venues, the engineering department or a similar department is responsible for ensuring that the ride or attraction's critical and regulatory maintenance work is completed prior to allowing the ride or attraction components to become available for patron usage. This regulatory maintenance is the Amusement Ride Law pertaining to Preventive Maintenance work that must be performed on the attraction components on a recurring basis. In addition, there are maintenance procedures that the Owner/Operator deems must be performed on the attraction components on a recurring basis, in addition to the Ride Law mandated Preventive Maintenances. The Owner/Operator and legislated Ride Law Preventive Maintenance procedures are based on the manufacturer's recommended time, distance or cycle schedule. It is imperative that the completion of these and other attraction component Preventive maintenance work is effectively and efficiently tracked to ensure that attraction components are available for patron usage only after this work has been performed.

Thus, theme park attractions are required by law and by the rules of preventive maintenance to be maintained in a satisfactory manner. Such rides and attractions generally have a recommended maintenance schedule.

There is a need for a system that automatically determines whether or not a theme park attraction component has had all Ride Law and Owner/Operator mandated Preventive Maintenance performed on it and any ride-critical Preventive Maintenance work. Such a system should automatically prohibit any component from being used if the Ride Law and Owner/Operator mandated Preventive Maintenance and ride-critical Preventive Maintenance work has not been performed or if a Corrective Maintenance Work Order has not been completed.

SUMMARY

It is an object of this invention to provide an Automated Maintenance Verification System which will automate the determination of whether or not an attraction component, in an entertainment or theme park environment, has had all Ride Law and/or Owner/Operator mandated Preventive Maintenance (PM) and ride-critical Preventive Maintenance (PM) work performed on it.

It is a further object of this invention to prevent any component of a ride or attraction with incomplete ride-law or ride-critical Preventive Maintenance work from becoming available for usage by patrons.

Another object of this invention is that the "data collection interface" (DCI) will access this information from a custom table stored in the "computerized maintenance management system" (CMMS), identify which attraction components are not allowed to become available for patron usage, and set the attraction component to a state in which it can not be utilized by patrons. Engineering Services may be able to access this information via an automated reporting tool to determine if an attraction component is ready for patron usage. The system may further update a WEB-based and/or plasma or other physical display status board showing the GO/NOGO status of the above-mentioned attraction components.

Another object of the invention will monitor the operators' completion of Owner/Operator and /or Ride Law daily start-up procedures. A magnetic card reader or biometrics unit may be installed in the ride or attraction's control tower to allow the Owner/Operator's designated representative to close out the daily Owner/Operator and/or Ride Law Start-up procedures in a secure fashion.

DETAILED DESCRIPTION

Figure 1:
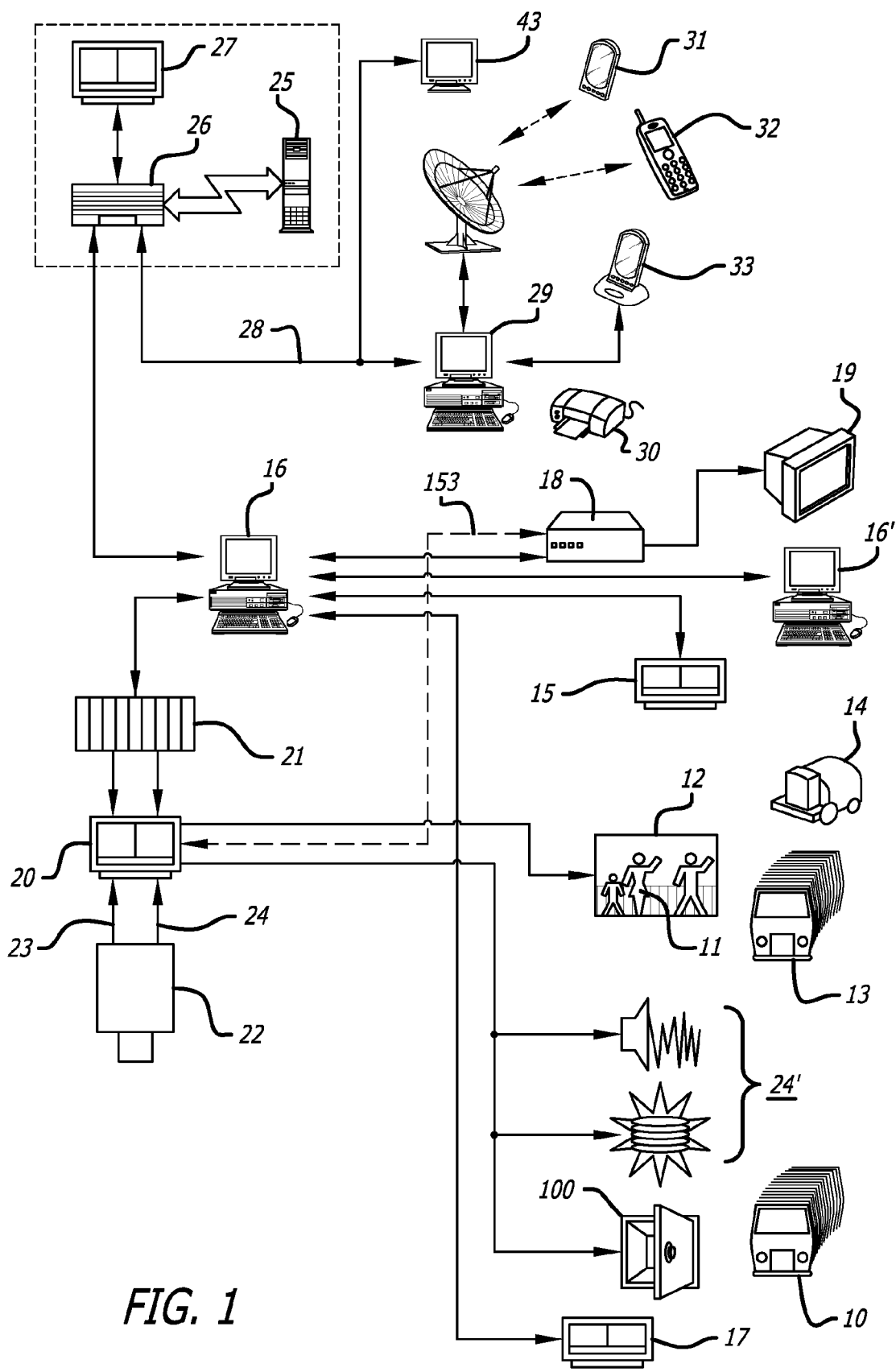
FIG. 1 is a block diagram of the system in accordance with the teachings of the invention.

Certain definitions, abbreviations and acronyms will be used to describe the various features of the system of the invention disclosed herein. These are as follows:

ACS: Attraction Control System

Attraction component: Consists of all ride vehicles, Launch Vehicles, ride track or any other ride or show component that requires a legislated PM. A component may also include a ride or attractions startup procedure that the owner/operator deems necessary.

Attraction Patron Load area: The area where patrons access the ride, or an attraction component of the ride.

Automatic Mode: The "Patron Ready" normal mode of operation. The ACS has complete automated control of all parameters relating to the operation of the attraction.

Biometrics Instrument: An automated system that can identify an individual through body parts.

CM: Corrective Maintenance.

CMMS: Computerized Maintenance Management System. A database application used by Engineering Services to manage workload, PM routines and schedules, and capture and store pertinent information about the facilities and equipment of the venue of the venue. In this environment, the CMMS will be used to store the cumulative number of laps for each component being tracked as well as a GO/NOGO status for that component.

DCI: Data Collection Interface: A PC based system running proprietary software that monitors and retrieves attraction component GO/NOGO PM data from the CMMS system, maintains a local data base of this collected data, maintains a local count of an attraction component's lap count, transmits count of an attraction component's lap count to the CMMS system, receives attraction component identification from the MIDS, and transmits either a GO or NOGO to the ACS based on the GO/NOGO status for the presented attraction component. It also monitors all local sub-systems for failures and transmits those failures to CMMS.

DCI (to ACS) Disabled Data Bit: The associated bit will remain low.

DCI (to ACS) Enabled Data Bit: DCI will pulse the associated bit high for 1000 ms.

Engineering Services: This is the group responsible for keeping the system in an operational condition and investigating system faults. Maintenance activities include investigating and repairing system faults and disabling and enabling the system. Maintenance activities may also include querying the system log.

Engineering: This is the group responsible for the development of the software and initial setup of system configuration (e.g. RF sensors, RF readers and alarm message associations).

E-Stop: A device, normally a pushbutton, that is activated to cause an attraction or attraction component to immediately stop all action and motion and to bring the component to its safe position.

GO/NOGO: The PM status of an attraction component. The component is either marked as GO (ready for patron use) or NOGO (requires PM action prior to being ready for patron use).

GPS: Global Positioning System.

GUI: Graphical User Interface.

Handheld device: A computer based system that can be easily and safely placed in one hand (i.e. PDA, cell phone, etc.).

Local Manual Mode: All automated ACS functions are disabled and only manual operation can be implemented through trackside boxes.

Main Manual Mode: This mode is a combination of Automatic and Local Manual Mode.

Maintenance Bay: The DCI computer and its interface, the Status Display, the override enable magnetic card reader or biometrics unit, the override revoke button, a Microwave Tag Reader and an audio alarm all reside in the Maintenance Bay, in addition to the existing ACS components and standard attraction's tools and components.

Maximo®: Maximo® is an off the shelf CMMS product offered by MRO Software Inc. of Bedford, Mass. and may be used by a particular venue as the system of record for maintenance activities. The database is an Oracle database from Oracle Corp. of Redwood Shores, Calif. and UNIX is a computer operating system managed by the Open Group, of Oak Brook, Ill. residing on a UNIX server.

Microwave Tag Readers: A device that detects and reports microwave tags.

MIDS: Microwave Identification System, which consists of microwave tag readers and microwave tags.

Operations: This is the group responsible for operating the system. Operational activities may include querying the system log.

Owner/Operator Critical PM: Refers to a Preventive Maintenance procedure, above and beyond the Ride Law PMs, that the Owner/Operator deems to be critical and necessary.

PM: Preventive Maintenance or Preventive Maintenance procedure.

PM Trigger Point: The manufacture's recommended maximum-metered point for a PM to be preformed, minus the cycling data for one full 24 hour operation.

RC: Ride Critical. RCCM, for example, is corrective Maintenance that is identified while performing a Amusement Owner/Operator and/or Ride Law PM procedure.

Ride Equipment Room (RER): Room containing the attraction's attraction control systems equipment.

Ride Legislated, Ride Legislative, Ride Legislation, Ride Law procedures: Refers to procedures defined as Governmentally Legislated Ride procedures applicable to rides and attractions at a venue that have been signed into law.

Station Gate: A system used to allow/disallow patrons access to the ride, or an attraction component on the ride System Users.

Status display: May consist of a LED, plasma, LCD, or other indicator panel or a computer Graphical User Interface display.

Status Update: A PM or CM status change from "GO" to "NOGO" will only be updated in the CMMS once a day, before normal operating hours. A status change from "NOGO" to "GO" will be updated in the CMMS, as the PM or CM is completed. DCI will periodically retrieve the PM status from the CMMS throughout the day.

Subsystem: Consists of CMMS, DCI, MIDS, ACS, and Magnetic Card Reader.

Tag: A passive or activated microwave, RFID, or reflective identification transponder.

Tower Control Room or Launch Base: Utilize the existing tower control room or Launch Base and all of its displays and interfaces. New messages will be routed to the displays to describe any conditions that will not allow normal ride operation.

Vehicle Launch: A ride vehicle entering or moving into or onto the ride path.

Thus, as particularly contemplated in this invention, it is thus proposed to automate the maintenance verification and monitor the usage of ride or attraction components at a venue. By doing so, one can implement a change from time or calendar driven PMs to meter driven PMs for some PM procedures. Attraction components have PM work that are performed on a daily, weekly, monthly or annual basis, regardless of whether or not the attraction component was used in the attraction. Unnecessary PM work can result if it is performed on an attraction component that remained idle since the last time the PM was performed or has not achieved the recommended distance or cycle specification. The invention herein will automate the determination of whether or not a PM on an attraction component can be postponed due to inactivity and automatically postpone the PM in CMMS. This is illustrated in the graph shown in FIG. 13, as will be discussed further herein below.

By capturing the components' usage (lap counts, cycles, etc.) and updating the "Meter Reading" field for that component within the CMMS system, the system herein enables the core functionality of the Maximo® application to automatically create PM work orders. The work orders in the CMMS system will be accessible on screen in the CMMS application from a desktop PC, a printed copy or via a handheld device in a wired or wireless connection (i.e. IR, 802.11, IDEN, GSM, PCS, AMPS, TDMA, CDMA, etc.). The Engineering Services Representative will be able to update the work accomplished at a desktop PC or a handheld device with a wired or wireless connection.

Scope Description

The Automated Maintenance Verification System connects to the ACS via digital I/O signals. When an attraction component is detected as being in the NOGO state, the Automated Maintenance Verification System notifies the operator that an unusable attraction component is in the load position and locks the station gates. If the detected attraction component is not a vehicle (i.e. it is a ride track, emergency Public Address System (P.A.), etc.), the Automated Maintenance Verification System will not allow the attraction to be placed into "Automatic Mode", thus disabling the attraction completely. It is the operator's responsibility to notify Engineering Services, who is then responsible to investigate the cause of the condition and take appropriate action. However, the Automated Maintenance Verification System will also notify Engineering Services and the Owner/Operator Designated Representative via wireless messaging of the condition.

The Automated Maintenance Verification System will also monitor attraction vehicles as they are inserted onto the ride from the maintenance bay.

In one embodiment of this invention, the Automated Maintenance Verification System will alert the attraction's Engineering Services' cast member, who is inserting the vehicle, through a visual alert as graphically illustrated in FIG. 1, if the vehicle being inserted has a "NOGO" status.

Thus, as seen in the block diagram of FIG. 1, a vehicle 10 for a ride attraction of the system is shown entering the system from the maintenance bay (not shown). Patrons 11 are shown waiting at the station gate 12 for a ride vehicle 13. A pusher vehicle 14 is shown in standby status. Each ride vehicle is electronically coupled to a microwave reader 15 coupled to a computer 16. Band signals from modems (not shown) associated with computer 16 are passed between computer 16 and reader 15; between computer 16 and a microwave reader 17 in the maintenance bay; and between computer 16 and a conventional instant messaging system 18, then to a tower consol launch base 19. Messaging system 18 is also electronically coupled to a wireless communication system 20 which also receives a pair of parallel status data signals from a serial to parallel/parallel to serial device (such as an Opto-22 device)—ref. No. 21, which is electronically coupled as by a modem or the like back to computer 16. An override card reader and revoke push button 22 feeds both a disable bit 23 a revoke disable bit 24 to system 20. Wireless communication system 20 is electronically coupled to both the station gate 12 and to a GO/NO/GO audible indication station 24'. RS485 in FIG. 1, is in ISO defined communications specification. OPTO 22 is a serial/parallel device manufactured by OPTO 22 of Temecula, Calif. A second computer 16' communicating with computer 16 may also be provided. The system of FIG. 1, in the attraction processing section may include, Blue Hose system 153 which is a network communications system normally associated with programmable Logic Controller Systems.

As will be discussed further herein below, the computerized maintenance management system includes the aforementioned MAXIMO device 25 providing system calculation, management and configuration. A LAN/WAN connection 26 is associated with device 25 and received and sends signals to a conventional paging system 27. Signals from connection 26 are passed to computer 29 via line 28 and also to a status panel 43 as will also be discussed with respect to FIG. 2.

Figure 3:
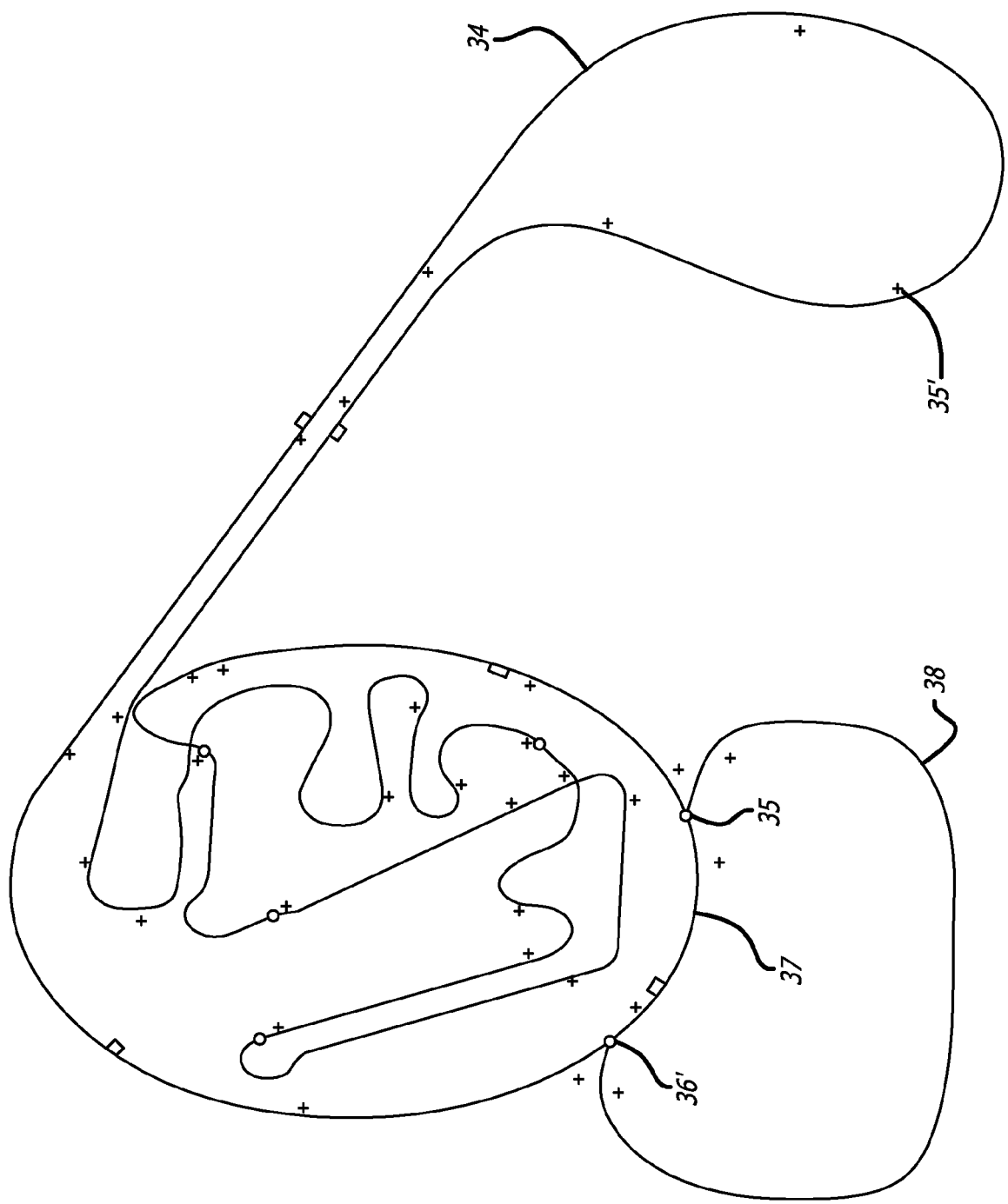
FIG. 3 is a schematic illustration of an attraction associated with a maintenance bay track.

In a second embodiment of this invention, the Automated Maintenance Verification System will also automatically remove the noncompliant vehicle from the ride path graphically illustrated in FIG. 3, back into the maintenance area, without allowing patron usage of said vehicle.

FIG. 3 thus shows a track 34 with entry point 35 and exit point 36. The patron load area 37 is between points 35 and 36. A maintenance bay track 38 communicates with track 34. A plurality of flagging and tagging areas indicated by + signs 35 and represent different points where possible monitored PM/CR/CM components exist.

In a third embodiment of this invention, the Automated Maintenance Verification System will also automatically lock any and all keys to any vehicles that are not in compliance, so that they cannot be removed so as to enable the vehicle.

In all cases, the Automated Maintenance Verification System will also notify Engineering Services and the Owner/Operator Designated Representative via wireless messaging of the condition.

Operational Design Requirements

Operational Overview

This section provides an overview of how the Automated Maintenance Verification System operates. It presents a "black-box" view of the system as a whole from the user's perspective.

Data Bit Definitions From DCI to ACS

Track Go Status

Track Amusement Owner/Operator or Ride Law PM due—Disable Attraction "GO bit" (NOGO)

Track Amusement Owner/Operator or Ride Law PM not complete—Disable Attraction "GO bit" (NOGO)

Track Amusement Owner/Operator or Ride Law CM created/not completed—Disable Attraction "GO bit" (NOGO)

Launch Vehicle Go Status

Amusement Owner/Operator or Ride Law PM due—Disable Launch Vehicle "GO bit" (NOGO)

Amusement Owner/Operator or Ride Law PM not completed—Disable Launch Vehicle "GO bit" (NOGO)

Amusement Owner/Operator or Ride Law CM created/not completed—Disable Launch Vehicle "GO bit" (NOGO)

Amusement Owner/Operator or Ride Law RC created/not completed—Disable Launch Vehicle "GO bit" (NOGO)

An Attraction component out of service status is set in CMMS

CMMS—Disable Attraction "GO bit" (NOGO)

Load Station Go Status

Vehicle Amusement Owner/Operator or Ride Law PM due—Disable vehicle "GO bit" (NOGO)

Vehicle Amusement Owner/Operator or Ride Law PM not complete—Disable vehicle "GO bit" (NOGO)

Vehicle Amusement Owner/Operator or Ride Law CM due—Disable vehicle "GO bit" (NOGO)

Data Bit Definitions from ACS TO DCI

Launch Vehicle Count Increment—This signal is pulsed for approximately 150 ms when the ACS "launches" a vehicle.

Override Enable Reporting—This signal is pulsed for approximately 150 ms, once a second, under "Normal Operation" and is disabled to indicate "Override Mode Enabled".

Operating the System

Summary

The addition of the Automated Maintenance Verification System will have a minimal effect on daily operation of the attraction from an Operations perspective. Thus, from an operator or patron perspective, the ride will continue to allow patron access to the vehicles through the station gates as shown in FIG. 2.

Figure 2:
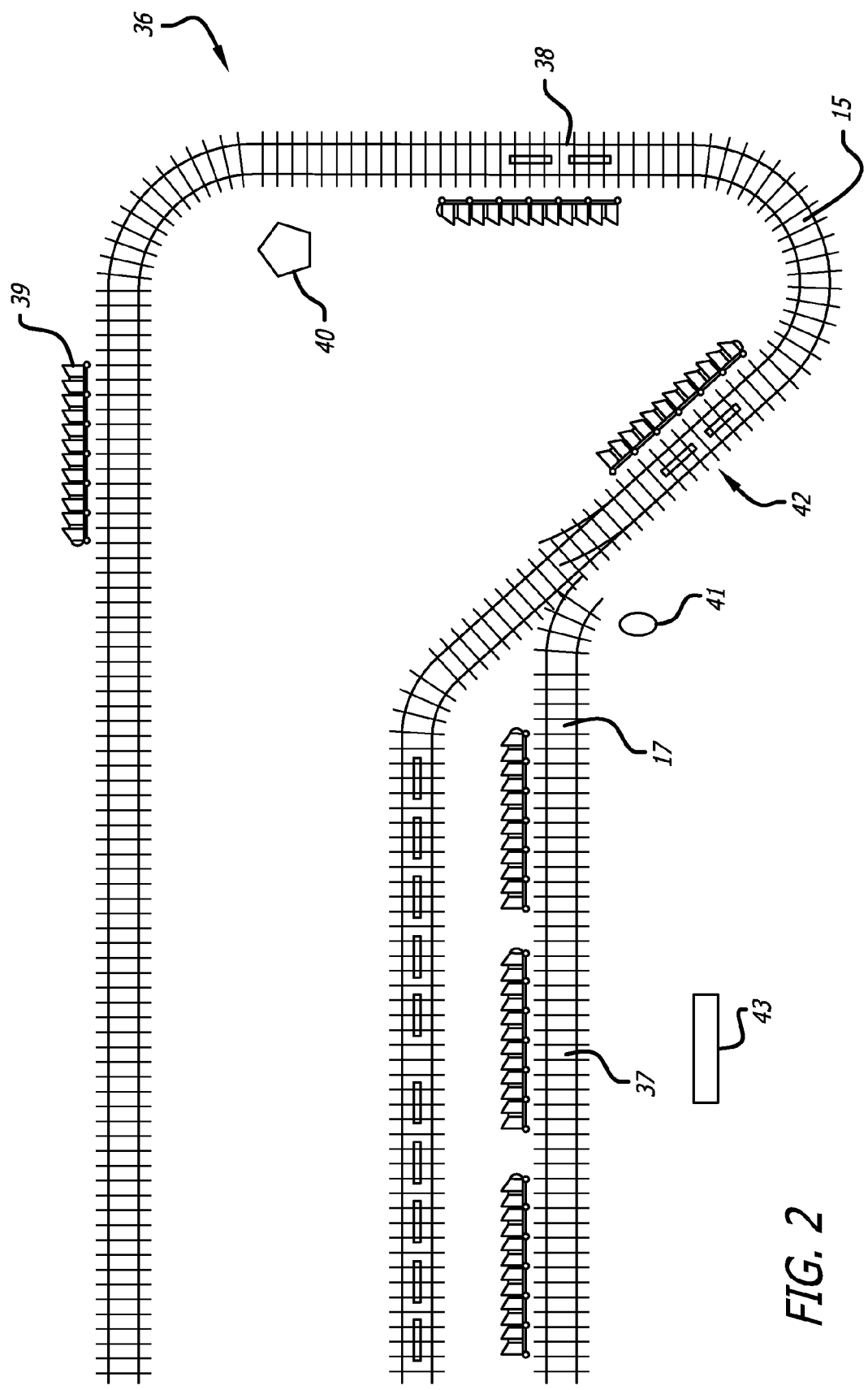
FIG. 2 is a stylized layout of an attraction utilizing the system of the invention.

Thus, as seen in FIG. 2, an attraction layout 36 is shown for a ride 39 or attraction. A maintenance track 37 communicates with the main track 38 of layout 36. A ride control tower 40 is disposed on layout 36 along with an insertion alert panel 41. The position of microwave reader 17 (FIG. 1) is indicated at track 37 whereas the position of microwave reader 15 is indicated at track 38. A ride unload area 42 is shown and a status panel 43 is also indicated. Thus, in the layout 36 of FIG. 2 the operator will note a difference if an attraction component has an outstanding PM. Under this condition, the Automated Maintenance Verification System will instruct the ACS to either: a) not allow the ride to operate in "Automatic Mode", if the PM is an attraction wide PM (i.e. Launch vehicle, track or track component, Operator daily start-up procedure, etc.) or b) the ACS will inhibit opening the station gates automatically, if the PM is a vehicle PM.

Both scenarios will cause the monitor in the attraction or ride control tower 40 (FIG. 2) to display a message describing the error condition; notifying designated personnel through a paging system. If the condition is vehicle-related, the system allows the operator to "launch" the empty vehicle; if the condition is attraction wide, the system allows the operator to only enter and operate in a "Local Manual Mode".

This condition will continue until either the PM is completed or the offending vehicle is removed from the ride.

Owner/Operator designated representatives have the ability to place the ACS into "override" mode by identifying themselves through a biometrics device or by swiping their ID and entering their PIN into the maintenance bay override enable card reader. By doing this, the ride will operate exactly as prior to the implementation of the Automated Maintenance Verification System, opening the station gates for all vehicles. The system will automatically revoke override mode at opening, when an "E-Stop" is executed or if the ride (building) power is cycled. The ACS can also be taken out of override mode manually by pressing the "revoke push button" 22, FIG. 1, which is located in the maintenance bay of FIG. 2. If the "NOGO" condition has not been corrected and the override is revoked, the ride will operate as described in above.

Normal Automated Operation

Figure 6:
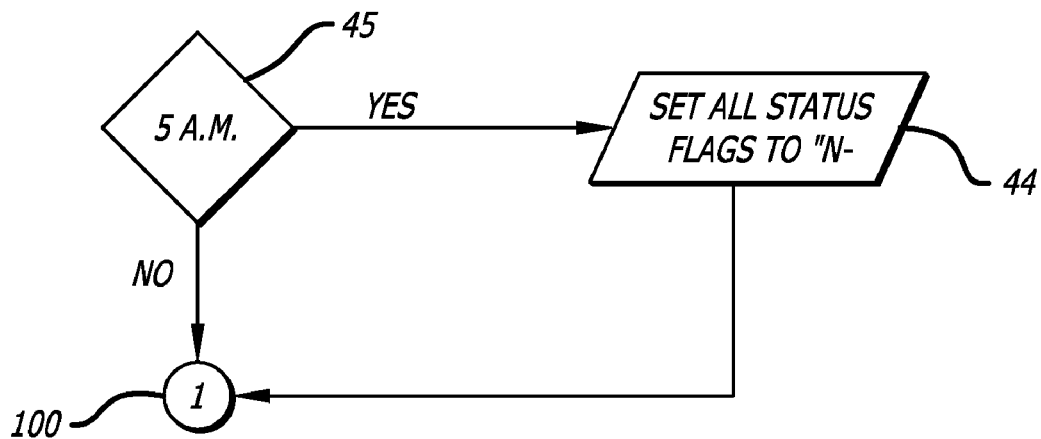
FIG. 6 is a schematic illustration of Ride Readiness Status Reset.
Figure 7:
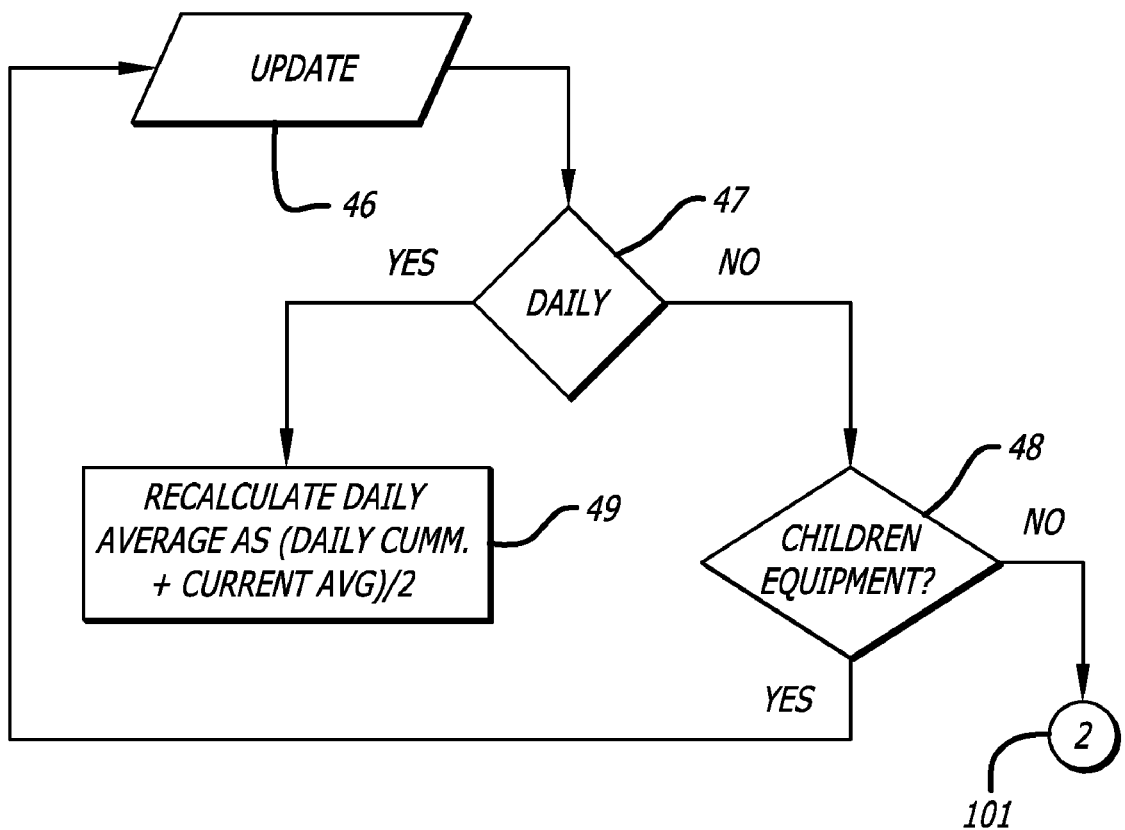
FIG. 7 is a schematic illustration of Maximo® Meter Update.

After the attraction closes, but before it opens for the next day's operation, the CMMS system will set all components status to "NOGO" in the Ride Status table (FIGS. 6 and 7).

The Ride Readiness Status Reset of a ride is shown in FIG. 6. For example, the ride may have all its status flags sets to NO GO as indicated at box 44 at 5 am (see box 45). A NO signal is sent to ride component 100. As seen in the Update box 46 in FIG. 7, there will be an Update equipment meter reading that adds daily cumulative data to the current meter reading. the signal is fed to a Daily data panel which determines if the accumulated data from box 46 is greater than the 10% daily average. If so, a NOGO signal is fed to the child components 48 of the ride which is communicated to ride component 101. If Yes or Go, a signal is fed to a Daily Recalculate box 49 where the daily average is recalculated as the Daily Cumulative amount plus the Current Average amount divided by 2. This information is fed back to the child components 48.

The CMMS system will then increment the Equipment Meter Reading within the Maximo® application (FIG. 7) by adding cumulative lap counts for each component and that component's associated equipment from the previous day, and will recalculate the average daily usage (FIG. 7).

In another embodiment of this invention, the Owner/Operator's designated Representative will either identify themselves through a biometrics device or swipe their ID through a magnetic reader and enter a security PIN, to validate that the Owner/Operator and/or Ride Law mandated start-up procedure has bee completed. This will then set the start-up flag to "GO" from "NOGO".

Figure 8:
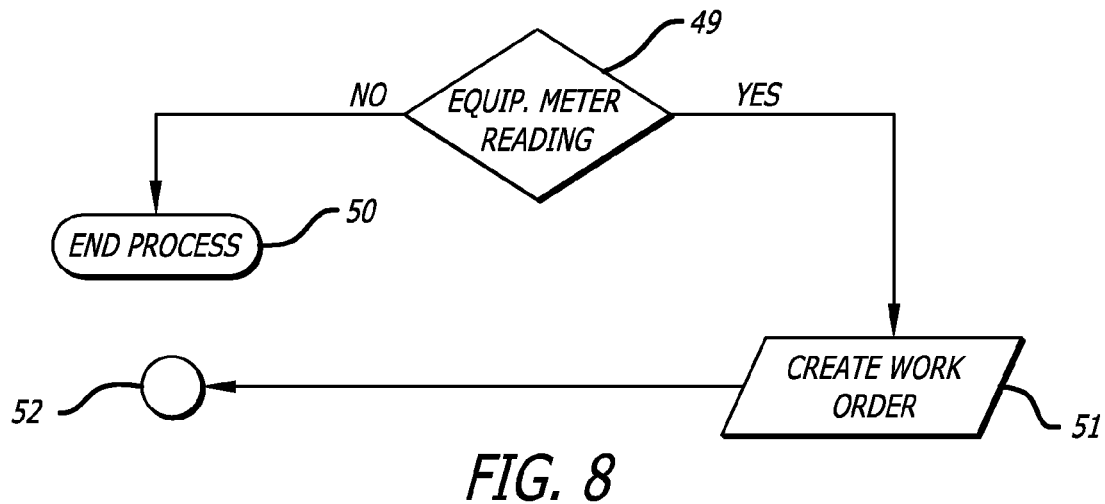
FIG. 8 is a schematic illustration of Meter Based Preventive Maintenance Work Order Generation Process.
Figure 9:
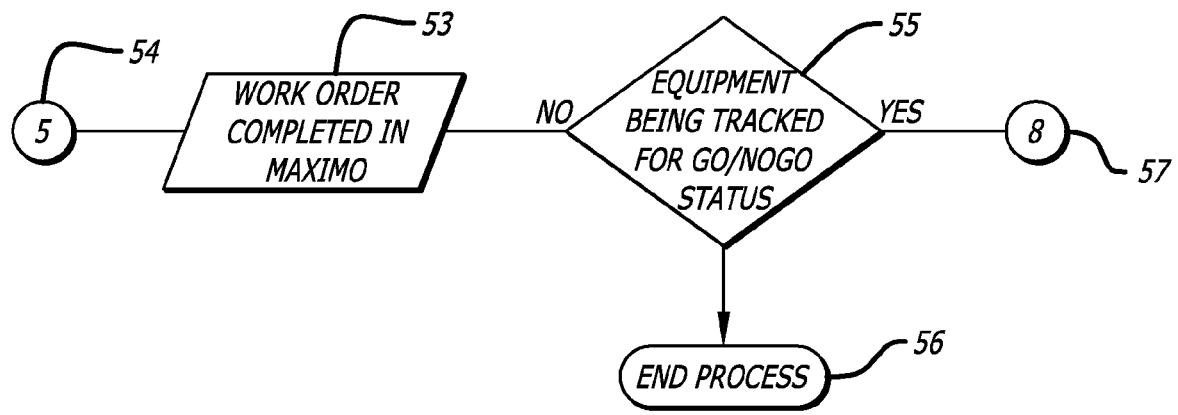
FIG. 9 is a schematic illustration of Work Order Completion Process.

Following the successful completion of updating the Meter Readings within the Maximo® application, FIG. 7, a scheduled routine will be called from within CMMS to evaluate all equipment that has Meter Based PM Schedules and determine if a PM routine will be due within the next 5 days (FIGS. 8 and 9).

Thus, as seen in FIG. 8, a meter-based preventive maintenance work order generation process is graphically illustrated. As indicated in box 49, an equipment meter reading is made plus 5 times the daily average. If this amount is greater than or equal to the last PM meter reading, plus a predetermined PM trigger point, a GO or NOGO signal is sent to either end the process (see box 50) or create a work order in the work order table (box 51). This sends a signal to process the work order (see ride component 52). This decision is made by looking at the meter reading (FIG. 8) the last time a PM work order was completed and adding the PM Trigger Point to that number. If that number is less than or equal to the current cumulative meter reading plus 5 times the daily average, then a PM Routine is determined to be due. As seen in FIG. 9, when a signal from video component 54 is sent, and a PM Routine is determined to be due, the Maximo® application (FIG. 53) will automatically create a PM work order for that piece of equipment 55. When the work order is created, a field in the Maximo® Work Order table is populated with the system due meter reading which that work is to be performed. Again, the process is either ended (see box 56) or the ride is passed to GO status (ride component 57).

Figure 10:
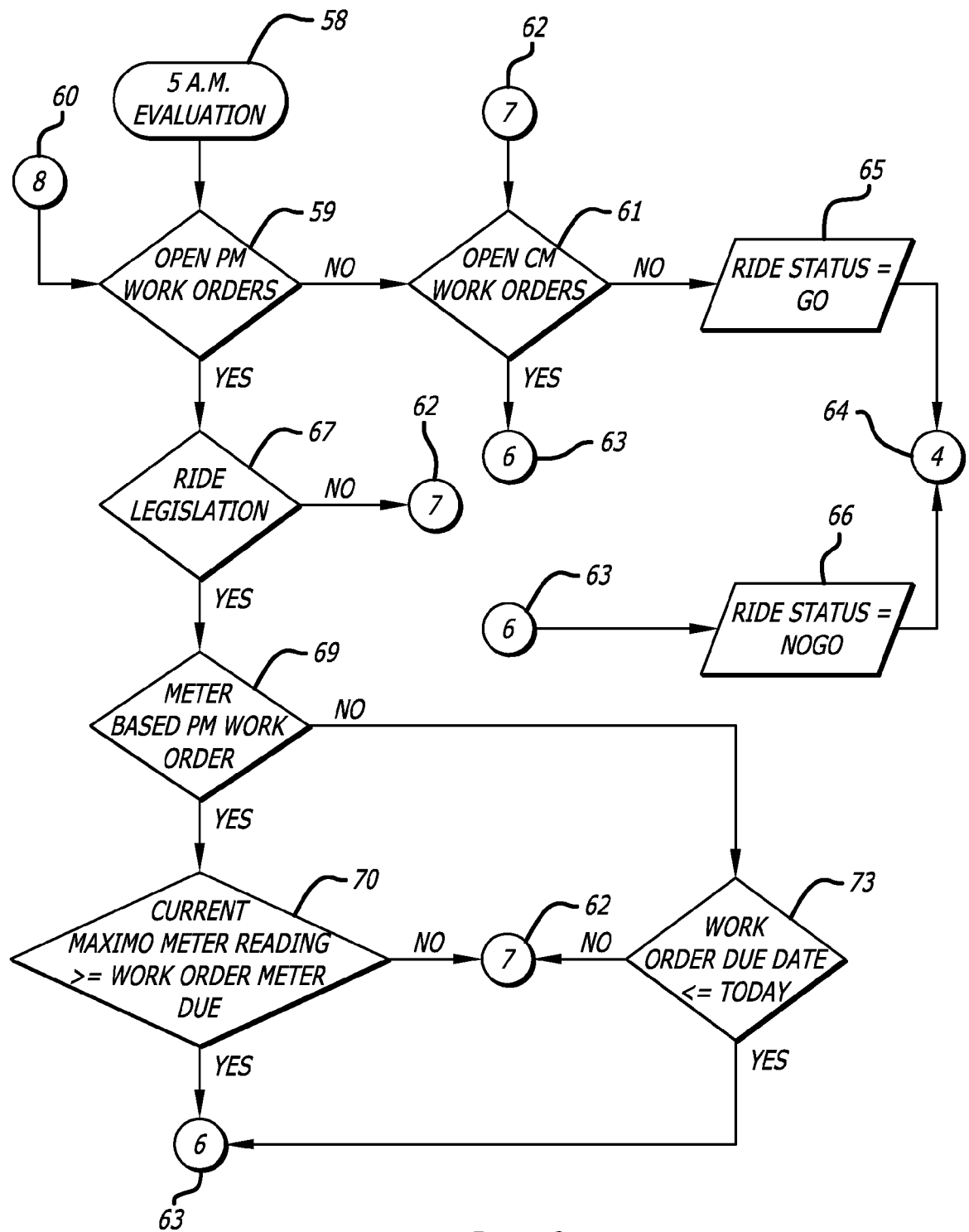
FIG. 10 is a schematic illustration of GO/NOGO Evaluation.

After successful completion of the Maximo® work order generation process, the CMMS system will perform an evaluation to determine the ride readiness status for each component being tracked by this system (FIG. 10).

This is shown in the GO/NOGO Evaluation schematic of FIG. 10. For example, if the 5 am Evaluation (box 58) shows open work orders (box 59) from the signal from the entry or exit point of ride component 60, a NO signal is passed to box 61 where open corrective maintenance (CM) work orders are disposed. A signal from the entry or exit point of ride component 62 is also shown as being passed to box 61. From box 61, a Yes signal may be passed to the entry or exit point of ride component 63 where as a NO signal may be passed to the entry or exit point of ride component 64 passing through a Ride Status equals GO box 65. A Ride Status equals NOGO box 66 is in communication with the entry or exit points of both ride components 64 and 63.

Thus, the circled numbers 4, 6, 7 and 8 represent the exit and entry points of the rides. If the arrow is going out to the numbered circle 47 for example, the function will continue and enter in at the circled number 4 with the arrow pointing in to a function.

If there is an Open PM word order with a Yes status, the signal is passed to a Ride Legislation box 67 and, if not in compliance, a NO indication is sent to entry or exit point of ride component 62. If in compliance, a Yes signal is sent to a meter based PM Work Order station 69. If Yes, or in compliance, the signal is sent to a Current Maximo Meter Reading station 70 which determines if the reading is greater or equal to the predetermined work order meter due. If No, the No signal is sent to the entry or exit points of ride component 62. If Yes, the Yes signal is sent to the entry or exit point of ride component 63. If the signal from station 69 is No, it is sent to a Work Order Due Date station 73 which determines if the due date is less than or equal to the current date. If Yes, the Yes signal is sent to the entry or exit point of ride component 63. If No, the No signal is sent to the entry or exit point of ride component 62. This process will thus first set all of the attraction components status to "NOGO". It will evaluate all open work orders for each component and associated equipment to determine if any of the following are true:

a) Are there any open Amusement Owner/Operator and/or Ride Law non-metered PM work orders, which have a due date of the current date or before the current date?

b) Are there any Amusement Owner/Operator and/or Ride Law meter based PM work orders where the equipment's cumulative meter reading is equal to or greater than the system due meter reading which is stored on the work order within CMMS?

c) Are there any Amusement Owner/Operator and/or Ride Law start-up procedures not complete?

d) Are there any open corrective work orders with a work type of RC (Ride Critical)?

If the answer to any of these questions is true, then the CMMS system will allow the status of that component to remain "NOGO" in the Ride Status Table. If the answers to all of these questions are false, then the CMMS System will set the status of that component to "GO" in the Ride Status table (FIG. 10).

Upon completion of open work orders for components that have a status of "NOGO" in the Ride Status table, a trigger will fire in the CMMS application to re-evaluate that component's ride status based on the criteria mentioned above. If the component no longer has any Amusement Owner/Operator and Ride Law PM work orders due, and it does not have any RC (Ride Critical) work orders open, then the CMMS system will change the Ride Status table for that component to reflect a "GO" status.

After the attraction closes, but before it opens for the next day's operation (at approximately 5:00 AM, for example), CMMS (FIGS. 1, 6 and 7) will automatically perform a "reasonability" test on the accumulative monitored meter data, to ensure the values have incremented within a proper predetermined window of probability (FIGS. 6 and 7).

Figure 4:
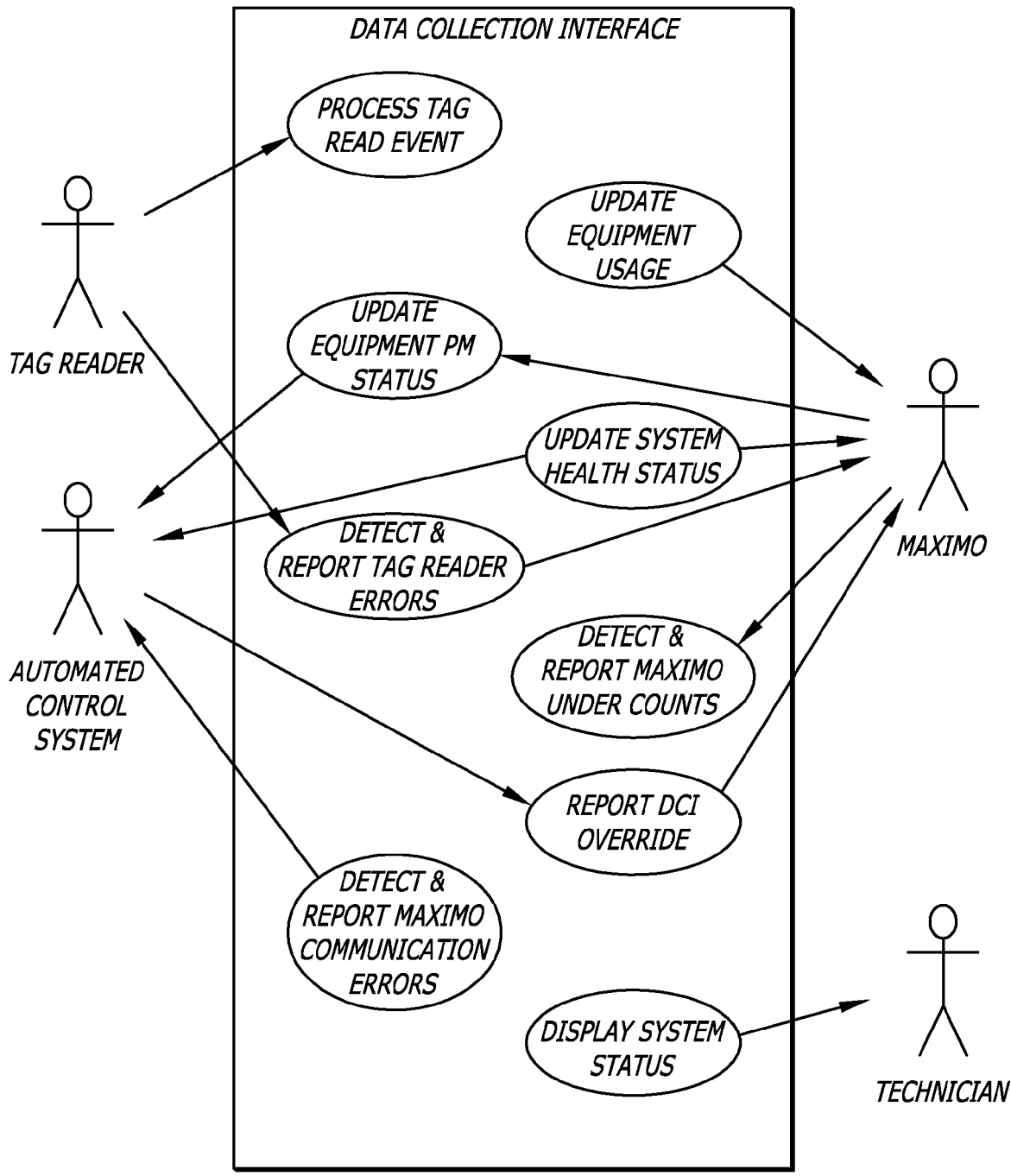
FIG. 4 is a schematic of a functional subsystem overview.

As seen in FIG. 4, a functional subsystem overview is shown.

DCI (see FIG. 4) periodically requests a status summary for the attraction. CMMS responds with the "GO/NOGO" status for all attraction components that require Amusement Owner/Operator and/or Ride Law PMs and Ride Critical Corrective Maintenance.

Figure 5:
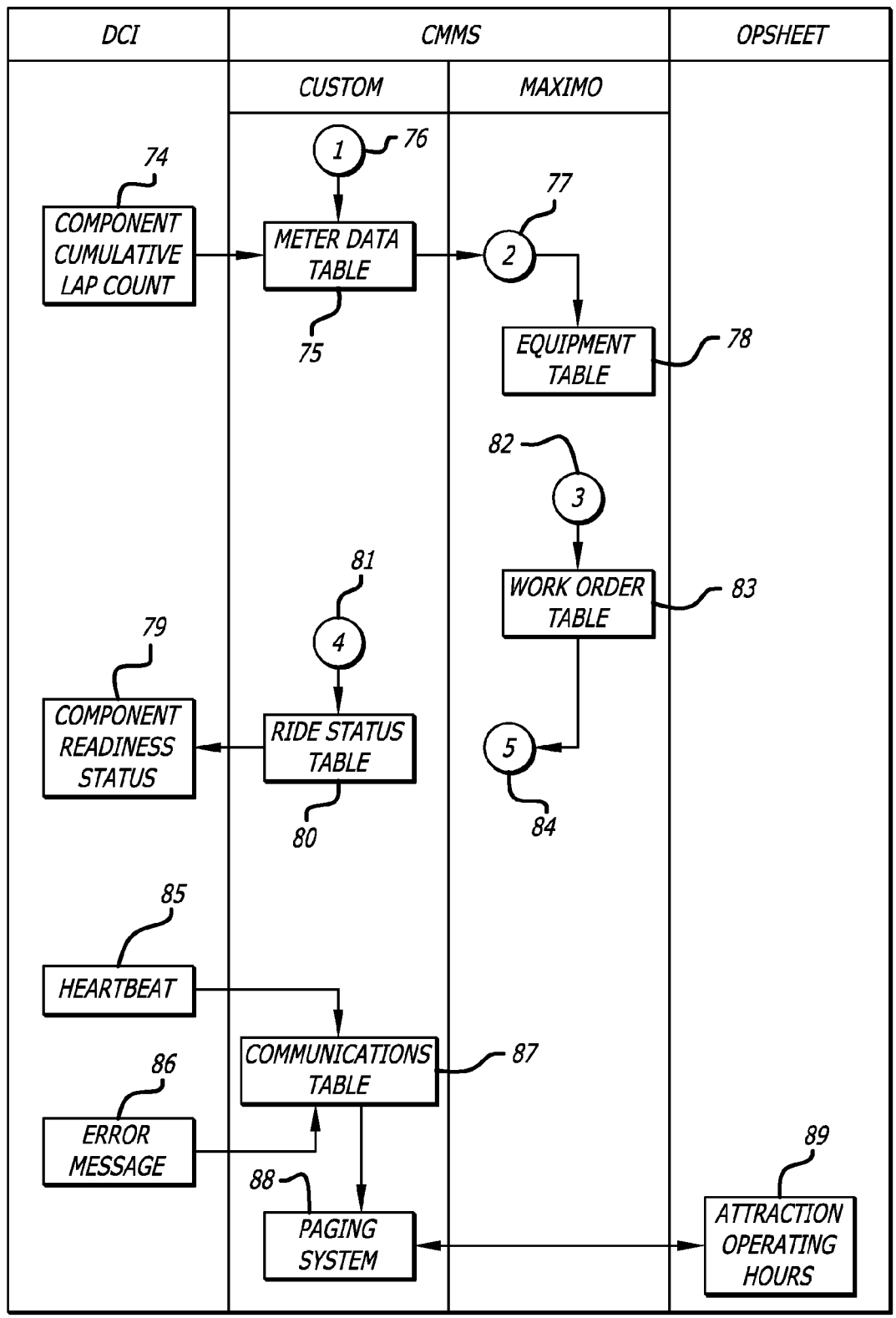
FIG. 5 is a schematic illustration of a computerized maintenance management system in accordance with the teachings of the invention.

Also, as illustrated in FIG. 5, the function of the CMMS system is shown. Data Collection Interface (DCI) collects data of a ride component's cumulative lap count (box 74) in communication with a meter data table 75 in the Custom portion of the CMMS. A signal from ride component 76 is fed into Table 75. From Table 75, a signal is fed to a ride component 77 which in turn is fed to an equipment table 78 which is part of the Maximo system. Going back to the DCI portion of the system, a ride component's readiness status (see box) receives a signal from a ride status table 80 (which receives signals from ride component 81. Signals from ride component 82 are passed to a work order table 83 which passes signals to ride component 84 controlled by the Maximo system. Again going back to the DCI part of the system, heartbeat signals (box 85), i.e., signals which continuously change state so as to verify that the transmitting system is functioning properly, and error messages (box 86) are passed to a communications table 87 in the Custom portion which in turn passes a signal to the Paging System 88. Paging System 88 is also being receiving park operating data via 89 from Op Sheet section. That is, OpSheet is the back end system that is the repository for collected data, tracks and reports on the utilization of the attractions.

The DCI updates its database based on the new information (FIGS. 4 and 5); automatically qualifying the data against the previous day's accumulated data and a reasonability algorithm.

Prior to opening, Operations representatives will attempt to place the attraction into "Automatic Mode". The ACS will check its "attraction GO bit" and, if enabled, allows the attraction to be placed into "Automatic Mode". If the bit is not enabled, the ACS will not allow the system to be placed into "Automatic Mode", but will enable the operator to place the system into "Local Manual Mode" only.

Vehicle Tracking

As a vehicle approaches the load station, it will pass: 1) over Microwave Reader #15 (FIG. 2), 2) through a RFID tag reader 3) receive an update from the GPS system or 4) receive an update from the ACS. In one embodiment of the invention, the tag reader will receive the vehicle tag identification data and asynchronously pass the tag IDs to DCI. In another embodiment of the invention, DCI will request and receive position data from the GPS system as a vehicle approaches the load area. In all cases, DCI will check the received ID tags data or GPS ID data against its internally stored database for, first validity, and then status.

Figure 11:
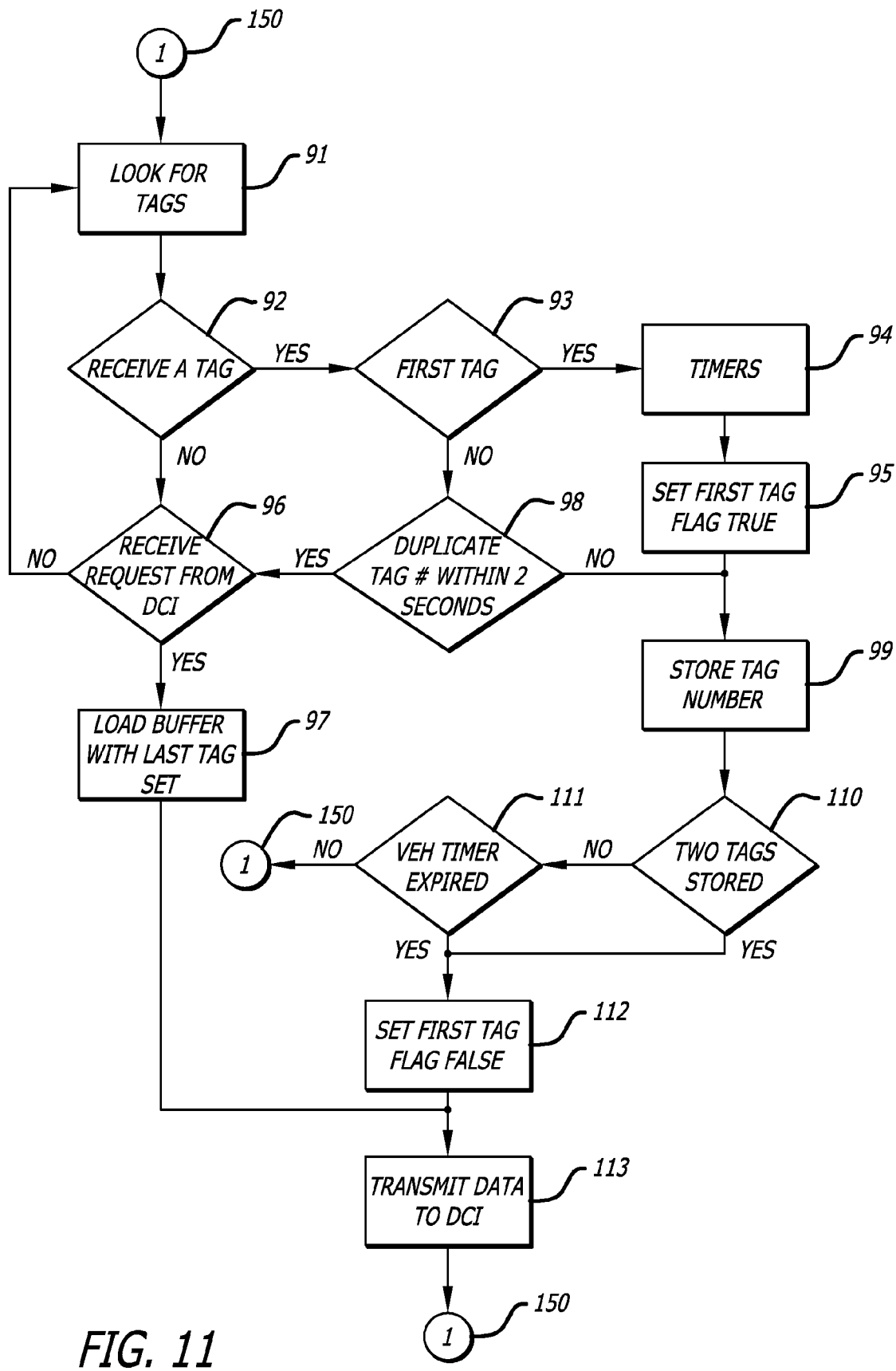
FIG. 11 is a schematic illustration of Microwave Tag Reader System.

The Microwave Tag Reader System is illustrated in FIG. 11. The system monitors all TAGS (box 91) from the entry and exit points of a ride attraction 150 and if it has received a tag, the process continues to box 93. The decision from box 93 starts the timers in box 94 (start timers, vehicle timer, duplicate tag timer) which sets the first TAG flag to True (box 95), if this is a new tag (received outside of a 2 second (variable) window of time. If a TAG is not detected at box 92, the path continues to box 96 where it checks for a request from DCI. If no request is pending, the process continues back to entry point A. If the DCI has requested a forced read the last TAG value is loaded a transmitted (box 97). If a duplicate TAG number is read within 2 seconds (see box 98) the reader checks for a request from DCI at box 96. If a different TAG is received within the 2 second window, the path continues to box 99 where the Tag Number is stored. From box 99, the path continues to decision point 110 where a check for two tags is made. If it is not a second TAG, the path continues to box 111 (vehicle timer expired) while if it is the second TAG the path continues to both box 111 and to box 112 (set first TAG Flag False) which sends a signal to box 113 (Transmit Data to DCI) which in turn sends the signal to the entry or exit point of ride attraction 150. A No decisionat box 111 forces the path to the entry point A DCI vehicle GO status bit: to ASC:

a) If either of the tags or the GPS IDs are not in the DCI database, DCI will NOT enable the GO status bit to the ACS.

DCI will transmit the error condition to the CMMS system for possible paging (FIG. 1) and for Engineering Services update information.

b) If both tags or both GPS IDs are in the DCI database, and either one has a "NOGO" status, DCI will NOT enable the GO status bit to the ACS. DCI will transmit the error condition to the CMMS system for possible paging (FIG. 1) and for Engineering Services update information.

c) If only one tag or one GPS ID is presented to the DCI, and it is in the database, and its status is "GO", DCI will enable the GO status bit to the ACS. DCI will transmit the error condition to the CMMS System for possible paging (FIG. 1) and for Engineering Services update information.

d) If both tags or both GPS IDs are in the DCI database, DCI will only enable the GO status bit to the ACS if both tags are associated with a component with a "GO" status. DCI will also increment the associated attraction component.

e) If both tags or both GPS IDs are in the DCI database, but are not associated with the same attraction component, DCI will only enable the GO status bit to the ACS if both tags are associated with a component with a "GO" status. DCI will also increment both associated attraction components and transmit the update to the Lap count table in the CMMS system (FIG. 1). DCI will transmit the error condition to the CMMS System for possible paging (FIG. 1) and for Engineering Services update information.

Vehicle Load

When the vehicle is detected in the "Load" area (FIG. 2), the ACS checks its GO status bit. If the bit is enabled, or was enabled within a predetermined window of time (from reader to load park), the ACS will enable the station gates (FIG. 1) to open automatically for patron loading. If the bit is not enabled, the ACS will inhibit opening of the station gates automatically, but will allow the operator to manually open the gates while the vehicle is parked at load. The move from load to launch function, and its associated button (FIG. 1), will be enabled under either condition.

Vehicle Launch

When a vehicle is detected at launch, the ACS checks its launch vehicle "GO" status bit. If the bit is enabled, or was enabled within a predetermined window of time, the ACS will enable the launch vehicle (FIG. 1). If the bit is not enabled, or was not enabled within the predetermined window, the launch will be inhibited, but vehicles already on the ride will be allowed to be moved to unload.

If the vehicle is not on a ride path (i.e. such as a simulator in a show environment) and the launch vehicle status is bit not enabled, or was not enabled within the predetermined window, the launch will be inhibited and that vehicle will not be allowed to move from its failsafe position or mode. Other vehicles in the same show will not be inhibited, but will launch based on their status bit.

Show Component

Another embodiment of this invention monitors Owner/Operator Critical attraction show components. Under this embodiment, a component deemed critical by the Owner/Operator is not allowed to operate if its Owner/Operator critical PMs and CMs have not been completed. The attraction show component would have a "NOGO" assigned and placed in its failsafe position or mode. If the show component is in a position to interact with or is above the patrons, the ACS will not allow the show to start.

This invention also monitors cast or performers attractions components and/or special effects attractions components. This invention will place these components in their failsafe position or mode if that component's status is "NOGO".

Override Operation

The ACS will continue to monitor the Override device's "Normal Operation Mode Bit" and "Revoke Override" button, but will disregard the DCI "GO/NOGO" status bits, while in override mode. The ACS will enable Automatic Mode and will enable the station's gates to automatically open at the appropriate time for patron loading.

The ACS will remain in override mode until the Revoke Override button is activated, the building/system power is cycled or an E-Stop is activated, whereupon the system will enter Normal Automated Mode.

If an attraction's component, that is going to be utilized by patrons, has a "NOGO" status, the following steps must be completed to implement "override mode":

a) Engineering Services must first verify that all Amusement Owner/Operator and/or Ride Law PMs, CMs and (RC) Ride Critical work orders have been completed for all attractions components that will be utilized by patrons, both through the CMMS interface and by hard copy Amusement Owner/Operator and/or Ride Law PM completion forms.

b) An Authorized Owner/Operator Designated Engineering Service Representative places the system into "Override mode" through the override biometrics identification device or override card reader, (FIG. 1) by presenting their biometrics feature or swiping their magnetic ID card and entering their PIN number or any combination of.

c) The identification device then verifies that the ID is authorized to place the system into "Override Mode". The device disables the "Normal Operation Mode Bit" to the ACS and the ACS will detect and notify the DCI of the change of mode.

d) The DCI will notify OpSheet of this change and will signal the paging system to page the owner/operator designated representative.

e) Engineering Services then opens a RC CM work order stating that the system has been placed into override mode.

Maintenance

As previously mentioned, the purpose of the Automated Maintenance Verification System is to verify the completion of ride legislative PM and RC Corrective Maintenance. This purpose has very little effect on the process of performing maintenance procedures; it simply ensures that those processes are complete. Similarly, the Meter Based PM System also has little effect on the maintenance process. It changes the way resources are scheduled for the completion of this work, but it does not change the nature of the work.

Attractions Component PM Becomes Due

Currently Engineering Services executes CMMS driven PM work orders based on calendar-based interval PM's. Engineering Service representatives leverage various forecasting, planning and reporting tools to determine the work due each day and allocate the appropriate resources.

The embodiment of this invention causes CMMS to generate PM work orders based on both calendar-based and meter-based schedules. As this system monitors the attraction component's usage, it automatically adjusts any meter based PM schedule to reflect this data. There is a savings in operational readiness as well the financial savings, while still maintaining the manufacturer's recommended PM schedule (FIG. 13).

Figures 12, 13:
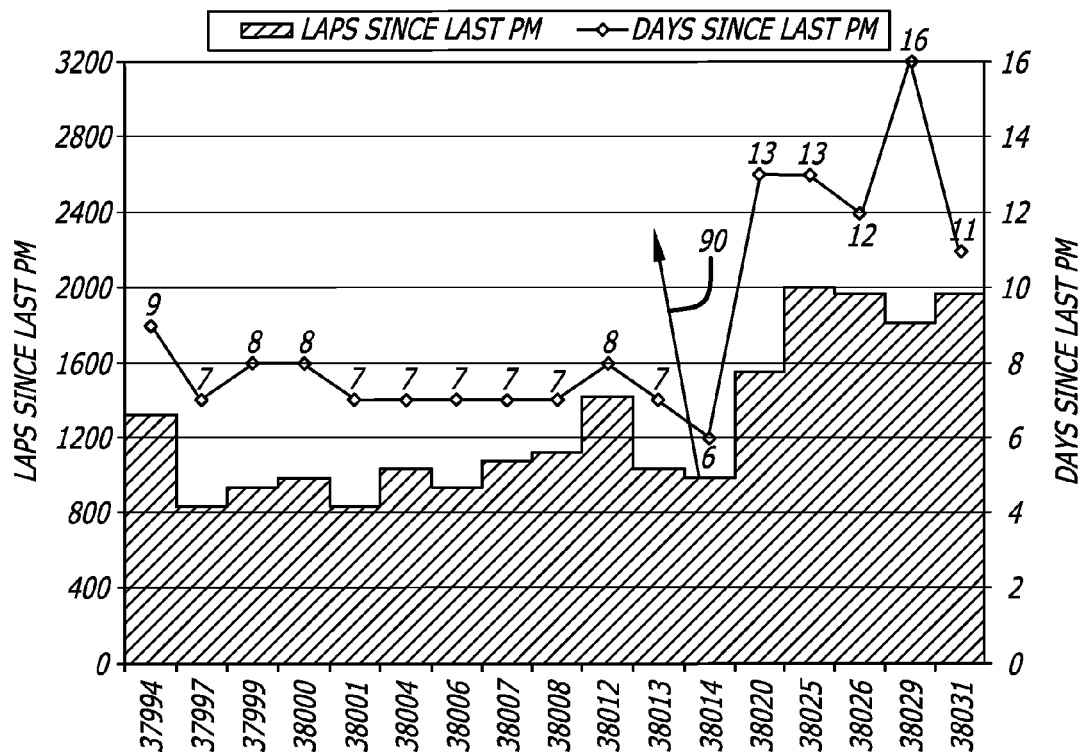
FIG. 12 is a schedule of Readiness and Maintenance Details.
FIG. 13 is a graph of Meter Based Maintenance Performance to a Certain Date for Mechanical Train Preventive Maintenance.

Thus, FIG. 13 shows the Meter Based Maintenance Performance to Date for a Mechanical Train's (ride Component) PM. Laps and Days since the last PM are displayed on the X axis and Cumulative Laps are shown in the Y axis. This chart, as indicated by the Arrow 90, indicates where the CMMS inspection interval for this particular attraction was changed from 1200 to 2025 from recalculation of the manufacturers requirement manual (MRM) requirements based on the theoretical hourly ride capacity (THRC) or the number of passengers handled hourly by an amusement ride.

The embodiment of this invention allows Engineering Services representatives to now leverage the status display panel and remote WEB status displays to determine the work due each day and allocate the appropriate resources, again realizing a financial savings. Furthermore, the Owner/Operator's designated Quality Assurance Representative can now quickly review the status display panel to validate the attraction's readiness to open for patrons. He/she may also monitor the status from their office in real time. As seen in FIG. 12, Readiness And Maintenance detailsis for a particular attraction may be presented, such as a plurality of train components numbered 1 through 6 with that train's Equipment (EQ) number indicated in Column 1. The second column shows the current meter reading for the particular component, the next column shows the last PM Meter reading of the particular component, the next column shows the next PM Meter reading and then the estimated date of PM. Finally, the type of PM that will be performed is indicated along with a countdown in laps or cycles or distance (here, cycles are shown) depending on the manufacture's recommended measurement.

Work Being Accomplished

At scheduled time or meter based intervals, a PM procedure will come due. Engineering Service representatives complete the CMMS generated Work Order according to documented procedures (or steps) of the PM. Either as the individual steps inside the PM are completed or soon after all steps are completed, Engineering Service representatives document the individual that completed each step. This documentation is stored either on hard copy forms or electronically through the CMMS system.

Under the embodiment of this invention, when a PM procedure will come due, the work order will automatically be printed and will also be automatically transferred to the maintenance handheld devices. The status display panel and remote status displays will automatically update to show the current status. An authorized Engineering Services technical representative is assigned a handheld device, whereupon they sign in using their PIN. The attractions component that requires a PM is scanned. This automatically brings up the proper PM procedure checklist on the handheld device, if the representative is authorized to perform the work. Multiple representatives using different handheld devices may work on the same attraction component.

As the work is completed, the appropriate box is checked. Upon completion of the PM, the authorized Engineering Services representative transmits the completed form to CMMS either wirelessly or through a docking type station. A different Engineering Services representative must sign on to either the handheld device used to perform the PM or a separate secondary handheld used device as a verifier to validate the first technician's data. This technician then verifies all steps and transmits this completed form to CMMS.

Closing a PM

Once all procedures are complete, the work order status must be changed to complete inside the CMMS system. Owner/Operator designated representatives verify the documentation through electronic or manual systems in order to verify the required Amusement Owner/Operator and/or Ride Law PM is complete. This verification process can occur any time of the day before the piece of equipment is put into operation.

Under the embodiment of this invention, the work order is closed through the handheld devices. When both the primary and secondary handheld devices have the forms completed for the required PM, the system automatically updates the database from "NOGO" to "GO". The system further passes this updated status to the status display panel and to DCI, wherein the attraction component will be available for use with patrons.

Starting an Attractions Component CM

In performing Preventive maintenance, Engineering Service representatives may identify items requiring corrective maintenance. If this occurs on an Amusement Owner/Operator and/or Ride Law PM procedure, a RC PM Work Order is created (FIG. 9). This RC Work Order is linked to the maintenance compliance procedures mentioned in previous sections through the Equipment Number and the Work Order Work Type (RC). Under the embodiment of this invention, the attraction component referenced in this RC will have a status as "GO" or "NOGO" and as such will follow the rules for a "GO" or "NOGO" PM.

Work Being Accomplished

Engineering Service representatives use previous experience, existing engineering requirements, training, and/or support from engineers to restore the equipment to documented operational standards as appropriate. The Owner/Operator may setup a checklist for a CM on the handheld devices under this invention, if it the rules and benefits stated above apply.

Closing a CM

Once the equipment has been restored to operational standards, the Work Order status must be changed to complete inside the CMMS system. Owner/Operator designated representatives verify the completion of the ride RC CM through electronic and/or manual documentation systems. CMMS then processes the completion (FIG. 9) and re-evaluates the attraction component's "GO/NOGO" status (FIG. 10).

If the Owner/Operator has setup a checklist for a CM on the handheld devices, under this invention the rules and benefits stated above apply.

Placing a Vehicle onto the Ride from the Maintenance Area

Before placing a vehicle onto the ride, an authorized Engineering Services Representative must first verify that all Amusement Owner/Operator and/or Ride Law PMs, CMs and (RC) Ride Critical work orders have been completed for the particular vehicle through the CMMS interface. Under the embodiment of this invention, the Engineering Service representative can verify the status by viewing the status display. The standard operating procedure to insert a vehicle will then be followed.

Prior to exiting the maintenance area (FIGS. 2 and 3), the vehicle ID tags are read by the maintenance bay reader or a GPS reading is triggered and the "GO/NOGO" status retrieved from the DCI database. If a "NOGO" status is detected, an alarm will activate to alert the Owner/Operator representative that the vehicle being placed onto the ride has an open Amusement Owner/Operator and/or Ride Law PM, CM or (RC) Ride Critical work order.

In another embodiment of this invention, the keys for all of the attraction vehicles reside in a lockbox 100 (FIG. 1). This lockbox identifies each key via a wireless ID system and locks each key on an individual basis. The operator will attempt to retrieve the key for the vehicle from this lockbox. This invention will identify the key, associate it with the vehicle, verify the status of the vehicle and only unlock the key for removal if the status is "GO".

Once a vehicle is placed onto the ride, it will follow all of the procedures as described under normal operation above.

Thus, in an entertainment or theme park environment, the Automated Maintenance Verification System will access information from a strategic asset management system, identify which attraction components are not allowed to become available for patron usage, and set the attraction component to a state in which it can not be utilized by guests through the "Station Gate System" or other attraction component or patron usage lock-out system.

In such an entertainment or theme park environment, the Automated Maintenance Verification System will display the status and predictive information so as to aid attraction/ride inspectors and other Owner/Operator representatives in assessing the availability of the attraction.

In such an entertainment or theme park environment, the Automated Maintenance Verification System will minimize, while maintaining the manufacturer's recommended Preventive Maintenance schedule, the amount of maintenance time required to accomplish the aforementioned Preventive Maintenance schedule by monitoring the components usage.

Finally, entertainment or theme park attractions' operators and maintenance representatives will be able to access this information via a Business Objects report delivered through Business Intelligence Web, or bi-web, in order to determine if an attraction/attraction component is ready to open.

Although a preferred embodiment of the invention is disclosed, variations thereof may occur to an artisan and the scope of the invention should only be limited by the scope of the appended claims.

We claim:

1. A method for preventive maintenance of a system comprising a plurality of components, the method comprising:
   determining a usage-based maintenance specification for each of the plurality of components wherein said specification of some of said components differs from the specification requirements of another of said components;
   monitoring usage of each of the plurality of components; and
   in response to monitored usage of a particular component meeting or exceeding a usage-based maintenance specification for the particular component, initiating at least one remedial action to cause preventative maintenance to be performed on the particular component, wherein said remedial action includes the step of automatically blocking access to the system.

2. The method of claim 1 wherein the step of initiating a remedial action includes the step of automatically generating a work order describing a preventative maintenance procedure for the particular component.

3. The method of claim 1 wherein the step of initiating a remedial action includes the step of automatically removing the particular component from operation.

4. The method of claim 1 wherein the step of determining the usage-based maintenance specification includes the step of determining a recommended accumulated distance traveled by said particular component.

5. The method of claim 1 wherein the step of determining a usage-based maintenance specification includes the step of determining a recommended accumulated number of usage cycles for the particular component.

6. The method of claim 1 further comprising:
   determining a time-based maintenance specification for each of the plurality of components; and
   in response to a particular component being in service for a time that meets or exceeds the time-based maintenance specification, initiating at least one remedial action to cause preventative maintenance to be performed on the particular component.

7. The method of claim 1 wherein the step of determining a usage-based maintenance specification for each of the plurality of components wherein said specification for at least a first non-vehicle component; a second vehicle component, and a third simulator in a show environment component.

8. A system for monitoring the performance of an apparatus comprising a plurality of components wherein each of said components has a usage-based maintenance specification with some of said components having maintenance specifications differing from the specification requirements of other of said components, the system comprising:
   a database containing a usage-based maintenance specification for each of the plurality of components;
   monitors coupled to meter usage of each of the plurality of components; and
   a control subsystem in communication with the database and responsive to the monitors and operative to determine whether metered usage of a particular component meets or exceeding a usage-based maintenance specification for the particular component.

9. The system of claim 8 further comprising mechanisms for automatically initiating at least one remedial action to cause preventative maintenance to be performed on the particular component in response to a determination by the control subsystem that metered usage of the particular component meets or exceeds a usage-based maintenance specification.

10. The system of claim 9 wherein the remedial action comprises automatically generating a work order describing a preventative maintenance procedure for the particular component.

11. The system of claim 9 wherein the remedial action comprises automatically removing the particular component from operation.

12. The system of claim 9 wherein the remedial action comprises automatically blocking access to the system.

13. The system of claim 8 wherein the usage-based maintenance specification comprises a recommended accumulated distance traveled by said particular component.

14. The system of claim 8 wherein the usage-based maintenance specification comprises a recommended accumulated number of usage cycles.

15. The system of claim 8 further comprising:
   storing a time-based maintenance specification for each of the plurality of components in the database; and
   a time-based control system operative to determine when a particular component has been in service for a time that meets or exceeds the time-based maintenance specification.

16. The system of claim 8 wherein the apparatus comprises a theme park attraction.

17. The system of claim 8 further comprising adjusting means in the control subsystem operable to automatically adjusting a preventative maintenance schedule of each component based on usage.

18. The system of claim 17 wherein at least one of said components is a non-vehicle component, at least one of said components is a vehicle component, and at least one of the said components is a simulator in a show environment.

19. A theme park attraction comprising:
   a plurality components, each of said components having a usage-based maintenance specification differing from the specification of reciuirements of other said components;
   monitors coupled to meter usage of each of the plurality of components;

means for communicating metered usage of each of the plurality of components to an external maintenance system; and an attraction control system configured to receive preventative maintenance instructions from the external maintenance system, wherein the attraction control system is configured to control the attraction's operation in accordance with the preventative maintenance instructions received from the external maintenance system.

20. The theme park attraction of claim 19 wherein the attraction control system is configured to remove particular components from operation in response to the preventative maintenance instructions.

21. The theme park attraction of claim 19 wherein the attraction control system is configured to automatically block access to the attraction in response to the preventative maintenance instructions.

* * * * *